(12) United States Patent
Skaugset (10) Patent No.: US 9,725,961 B2
(45) Date of Patent: Aug. 8, 2017

(54) FAIRING

(71) Applicant: STATOIL PETROLEUM AS, Stavanger (NO)

(72) Inventor: Kjetil Skaugset, Tiller (NO)

(73) Assignee: STATOIL PETROLEUM AS, Stavanger (NO)

( * ) Notice: Subject to any disclaimer, the term of this patent is extended or adjusted under 35 U.S.C. 154(b) by 0 days.

(21) Appl. No.: 14/783,758

(22) PCT Filed: Apr. 12, 2013

(86) PCT No.: PCT/EP2013/057657
§ 371 (c)(1),
(2) Date: Oct. 9, 2015

(87) PCT Pub. No.: WO2014/166543
PCT Pub. Date: Oct. 16, 2014

(65) Prior Publication Data
US 2016/0053554 A1  Feb. 25, 2016

(51) Int. Cl.
*E21B 17/00* (2006.01)
*F15D 1/10* (2006.01)
(Continued)

(52) U.S. Cl.
CPC ............ *E21B 17/006* (2013.01); *E21B 17/01* (2013.01); *F15D 1/10* (2013.01); *B63B 2021/504* (2013.01)

(58) Field of Classification Search
CPC ..... E21B 17/006; E21B 17/01; E02B 17/0017
See application file for complete search history.

(56) References Cited

U.S. PATENT DOCUMENTS 3,410,096 A  11/1968 Schuh
3,660,807 A   5/1972 Depew et al.
(Continued)

FOREIGN PATENT DOCUMENTS

CN     101475049 A    7/2009
EP      0096956 A1   12/1983
(Continued)

OTHER PUBLICATIONS

Apr. 12, 2013—(PCT) International Search Report—PCT/EP2013/3057657.
(Continued)

*Primary Examiner* — James G Sayre
(74) *Attorney, Agent, or Firm* — Banner & Witcoff, Ltd.

(57) ABSTRACT

A fairing device for the reduction of vortex-induced vibrations or motions and the minimization of drag about a substantially cylindrical element immersed in a fluid medium, comprising; a cylindrical element, a fairing rotatably mounted about the cylindrical element, the fairing comprising a shell with a cylindrical cross-sectional shape with an outer diameter (D) following the outer diameter of the cylindrical element from an upward stagnation point of 0 degrees to at least +/−90 degrees, and which at +/−90 degrees continues as two fin-like portions in an aft direction and defining a chord length (C), further comprising that the fin-like portions are convexly curved aft of +/−90 degrees thus tapering towards each other and defining a tail end opening or gap less than the fairing standoff height.

12 Claims, 7 Drawing Sheets

SCC1 perspective with cylindrical element.

(51) Int. Cl.
  *E21B 17/01* (2006.01)
  *B63B 21/50* (2006.01)

(56) References Cited

U.S. PATENT DOCUMENTS

| | | | |
|---|---|---|---|
| 5,410,979 A | 5/1995 | Allen et al. | |
| 5,421,413 A | 6/1995 | Allen et al. | |
| 5,984,584 A | 11/1999 | McMillan et al. | |
| 6,010,278 A | 1/2000 | Denison et al. | |
| 6,067,922 A | 5/2000 | Denison et al. | |
| 6,179,524 B1 | 1/2001 | Allen et al. | |
| 6,196,768 B1 | 3/2001 | Allen et al. | |
| 6,223,672 B1 * | 5/2001 | Allen | B63B 21/502 114/243 |
| 7,513,209 B2 | 4/2009 | Masters et al. | |
| 7,644,675 B1 | 1/2010 | Ha | |
| 2006/0021560 A1 | 2/2006 | McMillan et al. | |
| 2007/0215028 A1 | 9/2007 | Lie | |
| 2008/0035351 A1 * | 2/2008 | Masters | E21B 17/01 166/367 |

FOREIGN PATENT DOCUMENTS

| | | |
|---|---|---|
| EP | 2049805 A2 | 4/2009 |
| GB | 1408711 A | 10/1975 |
| NL | 7217431 A | 7/1973 |
| WO | 9822336 A1 | 5/1998 |
| WO | 2011072033 A1 | 6/2011 |

OTHER PUBLICATIONS

Apr. 12, 2013—(PCT) Written Opinion of the International Searching Authority—PCT/EP2013/3057657.
Bearman, P.W., 1984, "Vortex Shedding from Oscillating Bluff Bodies", Annual Review of Fluid Mechanics, 16, pp. 195-222.
Mar. 20, 2014—(PCT) International Search Report and Written Opinion—App PCT/EP2013/064028.
Sarpkaya, T., Jun. 1979, "Vortex-Induced Oscillations", Journal of Applied Mechanics 46, pp. 241-258.
Blevins, Robert D., 1994, Flow-Induced Vibration: Van Nostrand Reinhold, pp. 77-81.
Griffin, O.M. & Ramberg, S.E., Mar. 1982, "Some Recent Studies of Vortex Shedding with Application to Marine Tubulars and Risers", ASME Journal of Energy Resourses Technology, vol. 104, pp. 2-13.
Naudascher E. & Rockwell, D., 1994, "Flow-Induced Vibrations, An Engineering Guide", Hydraulic Structures Design Manual, Balkema, Rotterdam, pp. 156-171.
Kristiansen, T., Apr. 2009, Two-Dimensional Numerical and Experimental Studies of Piston-Mode Resonance, Ph.D. thesis, Norwegian University of Science and Technology.
Sumer, B.M., & Fredose, J., 1997, Hydrodynamics Around Cylindrical Structures, vol. 12, World Scientific: Singapore.
Skaugset, K.B., 2003, On the Supression of Vortex Induced Vibrations of Circular Cylinders by Radial Water Jets, Ph. D thesis, Norweigian University of Science and Technology.
Faltinsen, O.M., 1995, "Sea Loads on Ships and Offshore Structures", Cambridge University Press.
Dec. 2, 2016—(CN) Office Action—App 2016112901846900.

* cited by examiner

Figure 1a. Prior art parallel-fin (PAPF) fairing.

Figure 1b. Prior art fairing.

Figure 1c. Prior art fairing.

Figure 2. Short Crab Claw 1 (SCC1)

Figure 3. SCC1 perspective.

Figure 4. SCC1 perspective with cylindrical element.

Figure 5. Short Crab Claw 2 (SCC2).

Figure 6. Reynolds number (Re) versus drag coefficients (CD) for SCC1, SCC2, SCC1_30 fairings and bare pipe.

Figure 7. Single pipe experiments: chord length ratio (C/D) versus drag coefficients (CD) for PAPF fairings.

Figure 8. Single pipe experiments: amplitude of vibration (A*) versus drag coefficients (CD) for SCC1 and spring stiffness.

◇ Single SCC
△ Tandem, SCC-SCC, IN10D_OFF1D
✶ Tandem, SCC-SCC, IN5D_OFF0D
□ Tandem, SCC-SCC, IN10D_OFF0D
✕ Tandem, SCC-SCC, IN5D_OFF1D Figure 9. Nominal reduced velocities (U*) versus A* for tandem SCC1-SCC1 experiments.

Figure 10. U* versus A* for tandem SCC1-PAPF experiments.

Figure 11. Reynolds number (Re) versus drag coefficients (CD) for tandem SCC1-SCC1 experiments.

Figure 12. Reynolds number (Re) versus drag coefficients (CD) for tandem SCC1-PAPF experiments.

Figure 13a. Theoretical stability analysis curves for prior art fairing from Figure 1b. X-axis Flow velocity (m/s) versus Y-axis stability factor q(U).

Figure 13b. Theoretical stability analysis curves for prior art fairing from Figure 1c. X-axis Flow velocity (m/s) versus Y-axis stability factor q(U).

Figure 13c. Theoretical stability analysis curves for SCC1 fairing. X-axis Flow velocity (m/s) versus Y-axis stability factor q(U).

FAIRING

CROSS-REFERENCE TO RELATED APPLICATIONS

The present application is a U.S. National Phase of International Application No. PCT/EP2013/057657, filed Apr. 12, 2013, entitled "Fairing" and designating the United States of America. This application claims the benefit of the above-identified application which is incorporated by reference herein in its entirety.

FIELD OF THE INVENTION

The present invention relates generally to the reduction of vortex-induced vibration ("VIV") and more particularly to a fairing device and method for the reduction of VIV on pipes or other structural components immersed in a fluid.

BACKGROUND OF THE INVENTION

The search for oil and gas reserves over the past several decades has lead to the need for exploration in ever deeper waters. This in turn has lead to the need for offshore producers to build structures that can withstand strong ocean currents that could threaten the structural integrity of pipelines, risers or other immersed components.

The VIV oscillations of marine risers are known to increase drag, and have led to structural fatigue. One proven means of suppressing this vibration is the use of fairings and strakes. These coverings essentially modify the flow along the cylinder, tripping the production of Karman vortices so that they act less coherently or far enough downstream so they interact less with the body. In the existing prior art there are two general types of structures, helical strakes and fairings, for the suppression of VIV or vortex induced motions (VIM) around vertically disposed immersed objects such as risers or other supportive construction elements.

Helical Strakes:

Helical strakes are attached on the outside of a structure in order to suppress VIV by altering the vortex shedding pattern as well as the correlation of vortices shed along the length of the specimen. The most common helical strake geometry is the three-start strake. This consist of three triangular or trapezoid profiles which are helically wound and extend along the length of the specimen. The profiles can be permanently fixed to the specimen, or more commonly; attached using modules that are attached to the specimen. Regardless of attachment method, helical strakes are not designed to shift during operation but rather stay in a stationary position relative to the object. Two main parameters defines the global shape of strakes: pitch (P/D) and strake height ratio (h/D), where P designates the pitch of the strake in relation to the main direction of flow, D is the outside diameter of the cylinder and h is the external cross-sectional distance from the cylindrical member to the strake-tip. In addition, the local geometry of the strake profile itself characterizes the helical strakes.

Fairings:

Fairings are attached to a structural member in order to alter the vortex shedding pattern of that member when subject to ambient fluid flow. Fairings are attached in a way that allows for the fairing to rotate around the center of the structural member (for example a marine drilling riser) to which it is attached. This allows for the fairing to align with the direction of the ambient flow. Various cross sectional designs of fairings exist today.

In addition, other means of suppressing VIV also exist, such as perforated shrouds, but all suffer from some negative aspects that favour the two groups of concepts above to be used widely in industry today.

Such prior art systems as mentioned above are documented in the literature and are given in the following. Books and papers on suppression on Vortex induced vibrations and methods of VIV suppression:

Sarpkaya, T., 1979, "Vortex-induced oscillations", Journal of Applies Mechanics 46, pp. 241-258.

Blevins, R. D., 1990, Flow-induced Vibrations, Van Nostrand Reinhold: New York, USA.

Griffin, O. M. & Ranberg, S. E., 1982, "Some recent studies of vortex shedding with application to marine tubulars and risers", ASME Journal of Energy resources Technology, 104, pp. 2-13.

Bearman, P. W., 1984, "Vortex shedding from oscillating bluff bodies", Annual review of Fluid Mechanics, 16, pp. 195-222.

Zdravkovich, M. M., 1997, Flow around circular cylinders, Vol. 1: Fundamentals, Oxford University Press: London, UK.

Naudascher, E & Rockwell, D., 1993, Flow-Induces Vibrations: An Engineering Guide. Balkema: Rotterdam, Netherlands.

Faltinsen, O. M., 2005, Hydrodynamics of High-Speed Marine Vehicles. Cambridge University Press.

Kristiansen, T., 2009, Two-dimensional numerical and experimental studies of piston-mode resonance. Ph.D. thesis, Norwegian University of Science and Technology.

Newman, J. N., 1977, Marine Hydrodynamics. The MIT Press, Cambridge, Mass.

Sumer, B. M. & Fredøse J., 1997, Hydrodynamics around Cylindrical Structures. World Scientific: Singapore.

Skaugset, K. B., 2003, On the Suppression of Vortex Induced Vibrations of Circular Cylinders by Radial Water Jets, Ph.D. thesis, Norwegian University of Science and Technology.

Patent publications in this field include the following: U.S. Pat. No. 5,410,979, U.S. Pat. No. 5,421,413, U.S. Pat. No. 5,984,584, U.S. Pat. No. 6,010,278, U.S. Pat. No. 6,067,922, U.S. Pat. No. 6,179,524B1, U.S. Pat. No. 6,196,768B1, U.S. Pat. No. 6,223,672B1, US2006/0021560A1 and EP2049805B1.

In the following, the status of the mentioned prior art is explained in more detail. In terms of helical strakes known from the prior art, the following aspects and limitations should be noted:

Ability to suppress vortex induced vibrations (VIV):
  Specific dimensions of helical strakes are needed to achieve proper VIV suppression characteristics. The pitch and strake height are vital parameters. In general, increasing the strake height has a positive effect on VIV suppression characteristics. However, this comes with the price of high drag forces.

High drag forces:
  As explained above, helical strakes will increase drag forces on the structural member. This represents a structural capacity issue as well as potential operational limitations. In the case of a marine drilling riser, this can limit the operation in terms of pretension, top and bottom angle limitations and maximum tension in the riser. As a result, the drilling unit may be forced to suspend drilling operations in strong currents.

In terms of fairings, and in particular marine fairings known from the prior art, the following aspects and limitations should be noted:

Ability to suppress vortex induced vibrations (VIV):
The main reason for attaching fairing as a VIV suppression device is to reduce vibrations and material fatigue on the structure. However, existing fairings have varying suppression performance. For example, the flow condition window in which a fairing works as intended is limited. As the flow conditions experienced (such as ocean currents) is not deterministic but varies in magnitude and direction for a given location, it is vital to attain excellent VIV suppression characteristics for all operating conditions. Hence a fairing design that only works in a specific flow condition window is undesirable.

Global stability:
Existing fairings may become globally unstable for specific current flow conditions. This is a resonance phenomenon. The motions associated with such global instability can be devastating for a structural member. Motions will become considerably greater than the ones associated with VIV response, and may cause rapid material fatigue or structural overload. For an offshore application, the associated potential for loss of containment of hydrocarbons and the Health, Safety and Environment (HSE) risk can be relatively high.

Global loads on the structure:
Fairings are in general associated with relatively low drag forces. However, there is great room for improvement compared to existing designs. Local forces on the fairing are known to harm fairings during deployment, retrieval and operation. This is especially the case for large fairings and associated with interactions from waves either in the moonpool or in the upper part of the water column where wave action is most predominant. Fluid forces on the individual parts of the fairing may become large enough to cause the fairing to structurally disintegrate or get stuck, preventing weather-vaning, during operation. As this is known to have halted drilling operations, there is a need for new fairings to be small and robust in order to avoid this.

Robustness
Operational issues:
When deploying fairings on an offshore drilling unit several key operational challenges are associated with the fairing size and weight. Small, light fairings could overcome many operational issues.

Storage:
Present fairings or helical strakes require relatively large storage space on a drilling unit. Some drilling units may have very limited space to carry such devices.

Installation and retrieval time and cost:
A key cost factor for a drilling operation is the time to deploy and retrieve a marine riser. Using traditional helical strakes or marine fairings will halt normal operations due to manual labour involved in attaching the VIV suppression devices onto each joint of the marine riser. Increased total deployment and retrieval time will not only increase total time spent on the operation, but also increase demand on the available weather window needed to perform the operation. Offshore drilling units charge high daily rig rates, hence increased time for installation and deployment can prove very costly.

Installation and retrieval HSE:
High unit weight and size of a VIV suppression device is not only time consuming, but does also represents an HSE risk in the installation and retrieval phases.

Installation feasibility:
Due to limited space on the drilling floor, a simpler and more compact system and method for storage and deployment is needed.

SUMMARY OF THE INVENTION

Therefore, it is an object of the invention to provide a fairing system which is more effective and economic than the known prior art.

This object is solved with a system according to the independent claim. Advantageous further developments and embodiments are subject of the dependent claims and in the detailed description and figures.

BRIEF DESCRIPTION OF THE FIGURES

FIG. 7. Single pipe experiments: chord length ratio (C/D) versus drag coefficients (CD) for the prior art parallel-fin (PAPF) fairings of FIG. 1a.

DETAILED DESCRIPTION OF THE INVENTION

Figure 1A:
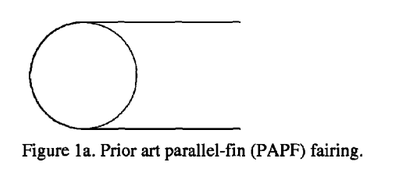
FIG. 1a-1c. Faring types according to the prior art.
Figure 1B:
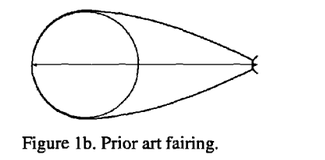
Figure 1C:
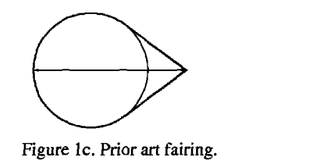
Figure 2:
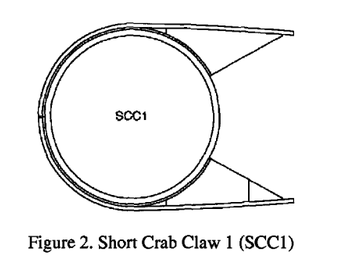
FIG. 2. SCC1 cross-section.
Figure 3:
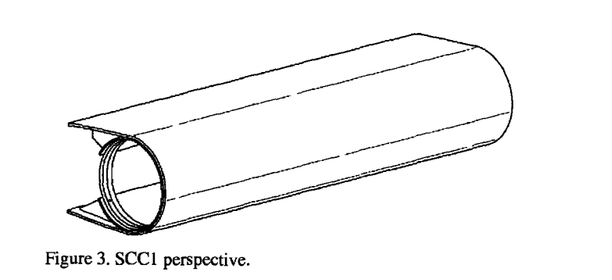
FIG. 3. SCC1 perspective.
Figure 4:
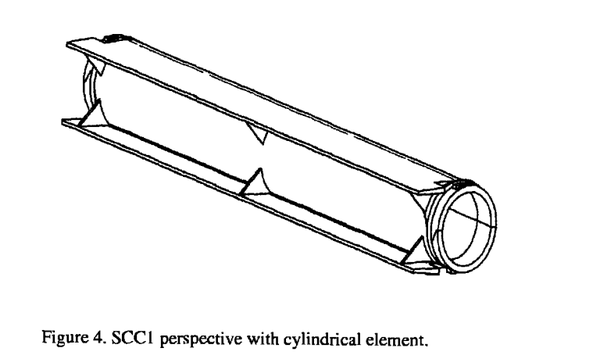
FIG. 4. SCC1 perspective with cylindrical element.

The present invention represents a vast improvement over the prior art as mentioned in the background section and FIGS. 1a-1c, whereby the mentioned shortcomings of the prior art are addressed by the following embodiments.

Fairing Device
Short Crab Claw (SCC):
The invention is a new specific fairings design which through thorough testing has showed superior performance compared to existing technology. This device is attached to a circular cylinder for suppression of vortex induced vibrations (VIV) or vortex induced motions (VIM). The device is able to rotate around the cylinder, and is hence able to align with the direction of the ambient current.

Shape of the SCC

The shape of the fairings is specific to the invention. When describing the shape, angular coordinates are used relative to the circular cylinder around which the fairings is applied. In this context, the upstream stagnation point for a stationary circular cylindrical element with an outer diameter (D) in steady inviscid flow is denoted 0 deg, while the one downstream is at 180 deg. The present invention is further defined by:

a) The shape of the fairing is convexly curved aft of +/−90 deg (SCC1), thus tapering towards each other and defining a tail end opening less than the fairing standoff height.

b) The fairing can be convexly curved also upstream (fore) of +/−90 deg (SCC2), but aft of +/−90 deg, curving is a pre-requisite, and tapering towards each other and defining a tail end opening, gap, less than the fairing standoff height.

c) Chord length (C): The overall fairing chord length ratio can in an embodiment of the invention be equal to or below C/D=1.4.

d) The tail end opening, gap, is more than 80% of the fairing standoff height. The invention also covers openings lower than 80%, but it is seen from tests, that the invention has best performance if the opening, gap, is more than 80%.

For all embodiments, the fairing standoff height is defined as the maximum cross-sectional distance between the opposing fins of the fairing, as measured external from the fairing. The term convexly, refers to a convex form as seen external to the fairing, having a outward projection away from the cylindrical element, as comparable to a double-convex optical lens, and as opposed to a concave form having an inward depression. FIGS. 2-5 showing the SCC1 and SCC2 fairings in cross-section, perspective and mounted about a cylindrical element illustrate this further. Table 1 gives non-limiting examples of dimensions for the SCC1 fairings as used in hydrodynamic tests. For the dimensions given below, and in terms of the scope of the present invention, the ratio values between the values are of more importance than the actual dimensions themselves.

TABLE 1

Short crab claw 1 (SCC1) test dimensions. The tests were conducted with three fairings (north, center and south) span-to-span, axially on a beam.

| Fairing Component | Chord Length (m) | Span (m) | Reference Diameter (m) | Tail End Gap (m) |
|---|---|---|---|---|
| North | 0.51 | 1.9 | 0.39 | 0.36 |
| Center | 0.52 | 1.9 | 0.39 | 0.36 |
| South | 0.52 | 1.9 | 0.39 | 0.36 |
| Total | N/A | N/A | N/A | N/A |
| Average | 0.52 | 1.9 | 0.39 | 0.36 |

Figure 5:
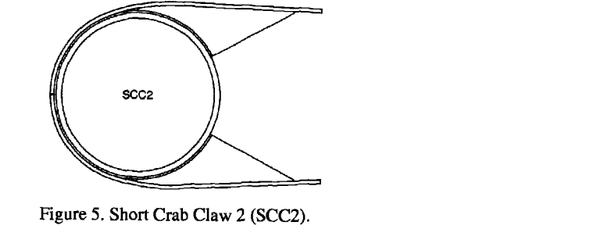
FIG. 5. SCC2 cross-section.

In addition to the basic SCC1 fairing, a second SCC fairing, SCC2, was constructed and tested. The SCC2 has its maximum diameter slightly further downstream. FIG. 5 shows the SCC2 fairing in cross-section. The maximum standoff height is defined as the maximum projection of the body as experienced by an incident water flow. Table 2 gives non-limiting examples of dimensions for the SCC2 fairings as used in hydrodynamic tests. For the dimensions given below, and in terms of the scope of the present invention, the ratio values between the values are of more importance than the actual dimensions themselves.

TABLE 2

Short crab claw 2 (SCC2) test dimensions. The tests were conducted with three fairings (north, center and south) span-to-span, axially on a beam.

| Fairing Component | Chord Length (m) | Span (m) | Reference Diameter (m) | Tail End Gap (m) |
|---|---|---|---|---|
| North | 0.61 | 1.9 | 0.44 | 0.40 |
| Center | 0.60 | 1.9 | 0.43 | 0.40 |
| South | 0.60 | 1.9 | 0.44 | 0.40 |
| Total | N/A | N/A | N/A | N/A |
| Average | 0.60 | 1.9 | 0.44 | 0.40 |

The fairing device and embodiments according to the present invention can be made from low corrosive material selected from a group of materials consisting of semi-flexible, formable polyethylene, polyurethane, vinylester resin, polyvinyl chloride and fiberglass. Other materials could easily be envisaged as would be known by the skilled person.

Experimental Setup

Test Setup

Free VIV experiments with the fairings were conducted in the towing mode with the cylinder towed downstream of the tow struts. The carriage speed was mostly varied from 0.5 to 4.5 m/s depending upon the appearance of VIV and tow carriage limitations, giving Reynolds numbers up to about 1.4 million. Helical springs in the damping frame were also varied, resulting in nominal reduced velocities, U*($V_{RN}$), of 2 to 24. The free tests were done at four different values of spring stiffness for the SCC1, SCC2 and PAPF fairings. Each of the above mentioned fairings were tested in the range of approximately 20 to 128 kN/m spring stiffness, which corresponded to system frequencies of 0.6 to 1.5 Hz. The bare cylinder was tested at 20 and 45 kN/m to perform the qualification tests at ~0.6 and ~0.9 Hz.

Data Processing

The basic data analysis consisted of determining the amplitude of vibration (VIV) A* and the nominal reduced velocity U* are defined as follows:

$$A^* = \frac{\sqrt{2}\,\sigma_Z}{D_R}$$

$$V_{RN} = U^* = \frac{V}{f_{N(V=0)} D_R}$$

Where $\sigma_Z$ is the standard deviation of the cross-flow (z) amplitude of motion and $D_R$ is the reference diameter taken as the outside diameter (maximum thickness) of the fairing. V is the carriage speed or flow velocity. The natural frequency, $f_{N(V=0)}$, is typically taken from still water experiments however for these experiments a low flow speed was required to align the units.

$C_D$, CD=Drag coefficient $C_{LV}$, $C_L$=Lift coefficient (lift force in phase with cylinder cross flow velocity)

$C_M$=Added mass coefficient (lift force in phase with cylinder cross flow acceleration)

Summary of Results

SCC1 and SCC2 Fairings: Drag, Single Pipe Experiments

Figure 6:
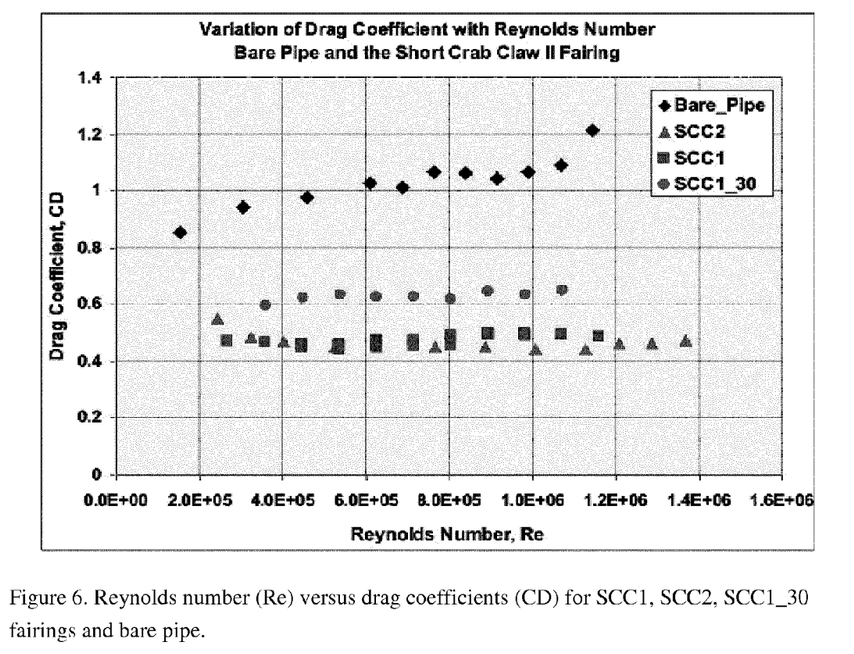
FIG. 6. Reynolds number (Re) versus drag coefficients (CD) for SCC1, SCC2, SCC1_30 fairings and bare pipe.

Pipes with SCC1 fairings were examined using two different spring sets to change the natural frequency. The spring constant did not have any significant effect on the drag value. Drag coefficients for the SCC1 and SCC2 fairings as well as for a bare pipe, or riser, as a function of the Reynolds number is given in FIG. 6. In addition, the test results for a SCC1 fairing fixed at 30 degrees pitch are also shown. Under certain circumstances during deployment in the ocean, a fairing may become "stuck" in position. This may due to excessive marine growth or other mechanical reasons. For this experiment, the center SCC1 fairing, refer to Table 1, was fixed at an angle of 30 degrees, in relation to the two neighboring fairings. The drag coefficient for the SCC1 fairing as a function of the amplitude (A*) is given in FIG. 8. The test results have shown that the SCC2 fairing shows slightly less drag, ca. 4%, than the SCC1 fairing, but the SCC1 fairing is somewhat more effective in VIV suppression than the SCC2 fairing.

PAPF Fairings Single Pipe Experiments: With Two Different Chord/Diameter Ratios

The chord length of the standard SCC1 has a chord length ratio of 1.4 or less. The PAPF fairings have a significantly longer chord length, having a standard chord length ratio of 1.75. This can be a disadvantage because of installation and available storage space. PAPF fairings with chord length ratios of 1.75 and 1.5 were constructed and tested with the goal of determining the effect, if any, of shortening the PAPF fairings such that they approach the chord length ratio of the SCC1 fairings.

The force and motion time traces for the PAPF fairings with chord length ratios of 1.75 and 1.5 were tested over a range of Reynolds number from 400000 to 950000. In both cases, there was significant VIV. The drag coefficient of the PAPF fairings was determined to be influenced by the chord length ratio. It was observed that the average drag coefficient increased from 0.5 to 0.65 when the chord length ratio was decreased from 1.75 to 1.50. This result is seen in FIG. 7 showing the drag of the prior art parallel-fin fairings as a function of chord length ratio.

The results show that the reduced chord length increased the drag force. These values are also significantly higher than the drag forces for the SCC fairings. The chord length reduction of the PAPF fairing that led to a reduced to a chord length ratio of 1.5 still shows about 30% higher drag forces than the SCC1 with a chord length ratio of 1.4. This is attributed to the design of the SCC1 and SCC2, with curved fins. Furthermore, tests have shown that the SCC fairings have consistently low drag when the chord length ratio (C/D) is further reduced to 1.278.

Figure 7:
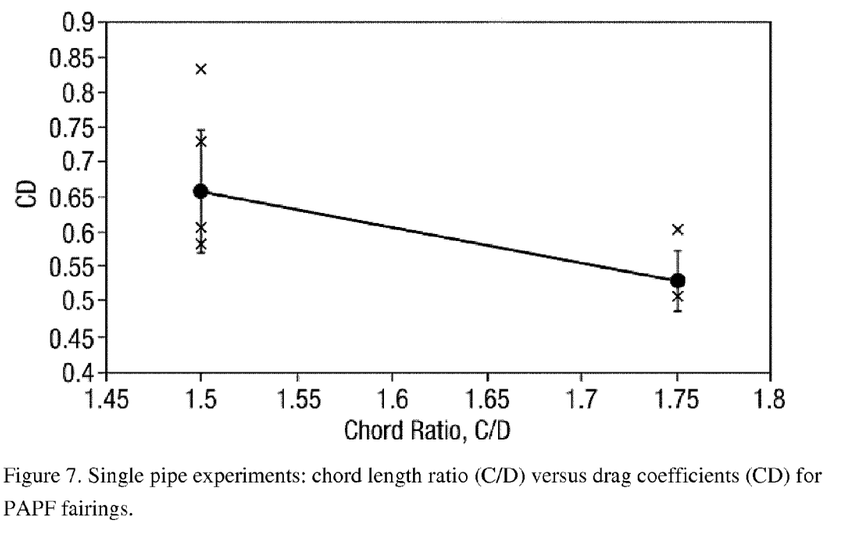
Figure 8:
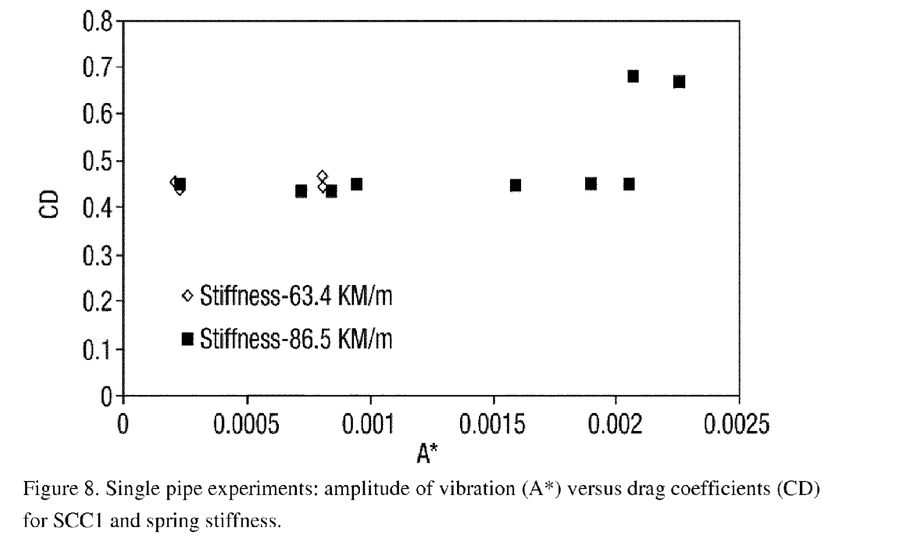
FIG. 8. Single pipe experiments: Amplitude of vibration (A*) versus drag coefficients (CD) for SCC1 and spring stiffness. Drag of SCC1 as a function of amplitude.

FIG. 7 shows the drag forces for two different chord length ratios for the PAPF fairings, while FIG. 8 shows the drag forces on the SCC1 for different amplitudes of movement. Since the SCC1 fairings suppress VIV, the drag forces shown from the SCC1 would be to the left of FIG. 7. Whereas SCC1 fairings had a drag of 0.43, the PAPF fairings show a minimum drag of 0.57 (an increase of more than 32%). Furthermore, it is seen that there is greater variability in the PAPF drag values than for the SCC fairings. It is speculated that this is due to the lower VIV suppression efficiency of the prior art fairings. This also means that PAPF fairings can exhibit significantly higher drag at an even lower chord length ratio of 1.5. It is noted that with the PAPF design, the trend is that shorter chord lengths yield both increased drag and increased variability in drag. This is not the case for the SCC fairings.

Tandem/Interference Test Results

Tandem tests were conducted where a downstream riser was free to vibrate in the wake of a fixed upstream riser. The upstream riser consisted of a pipe fitted with fairings. The downstream riser was fitted with fairings, where combinations of different fairings were tested. The VIV amplitude and drag of the downstream SCC1 fairing were measured in this tandem set up for offset distances (5D and 10D, where D is the outer diameter an upstream fairing) of an upstream SCC1 fairing. In a similar manner, the PAPF fairings, for both 1.75 and 1.5 chord length ratios, were tested downstream in tandem with SCC1 fairings installed on the upstream pipe. Also in this tandem setup, offset distances (5D and 10D) of an upstream SCC1 fairing were tested. Vertical offsets between fairings of 0D and 1D were also tested.

Figure 9:
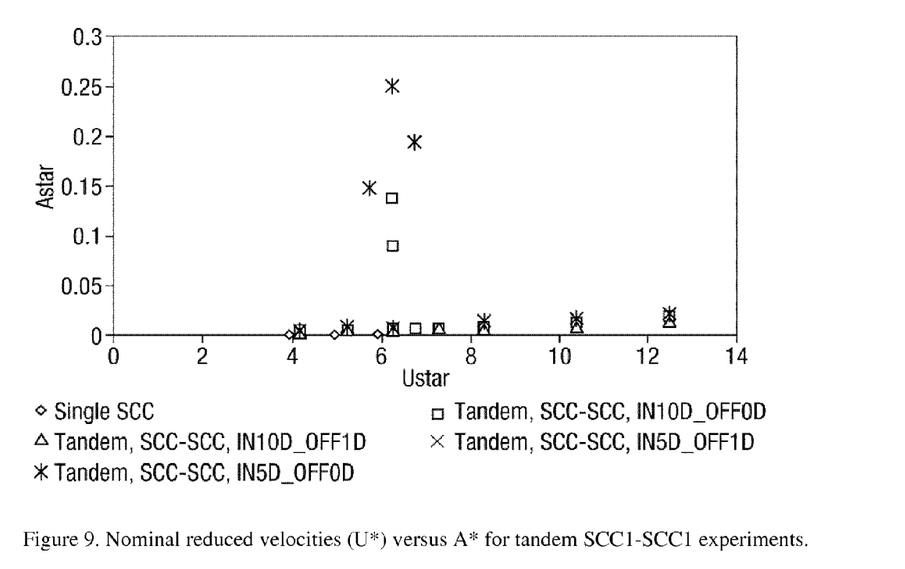
FIG. 9. Nominal reduced velocities (U*) versus A* for tandem SCC1-SCC1 experiments. Downstream pipe amplitude motion.
Figure 10:
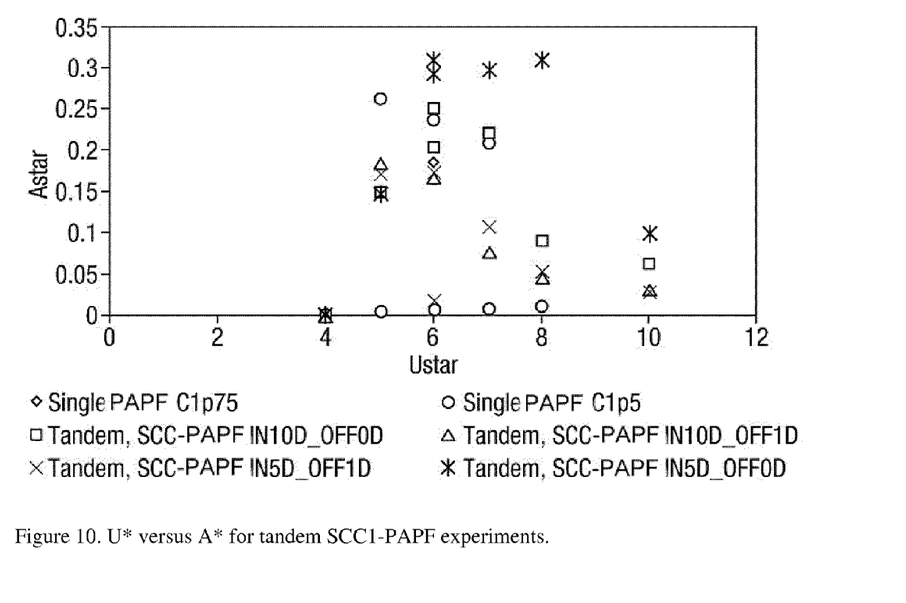
FIG. 10. U* versus A* for tandem SCC1-PAPF experiments. Downstream pipe amplitude motion for the PAPF fairings.

For purposes of comparison, see FIG. 9 "Single SCC" and FIG. 10 with both "Single PAPF C1p75" and "Single PAPF C1p5", showing U* (Ustar) plotted against A* (Astar). For reference, "C1p75" refers to a chord length ratio of 1.75, while "C1p5" refers to a chord length ratio of 1.5. This clearly shows that the SCC1 suppresses VIV throughout the range, respectively, while the PAPF fairings (C/D=1.75 and 1.5) do not suppress VIV as effectively. The short C/D=1.5 version of the PAPF fairings is seen to yield the highest values for A*.

The results also show that the SCC1 has considerable advantages when in the wake of another riser as compared to the PAPF fairings.

The figures below further illustrate this. In FIG. 10 we see that the PAPF fairings exhibit a considerable response in a wide range when it is in the wake of another structure. As shown in FIG. 9, the SCC1 response is much flatter, however, and has only a very narrow range where a larger response is obtained due to the structural member being situated in the wake of the upstream structure. These are important figures in relation to documenting the differences between PAPF and the SCC1 fairing types.

Figure 11:
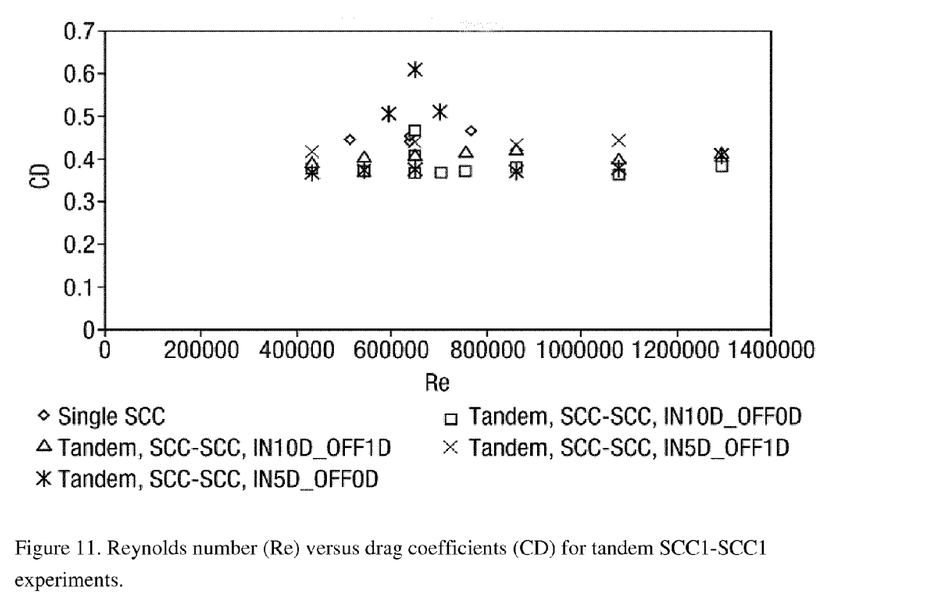
FIG. 11. Reynolds number (Re) versus drag coefficients (CD) for tandem SCC1-SCC1 experiments. Drag of downstream pipe for SCC1.
Figure 12:
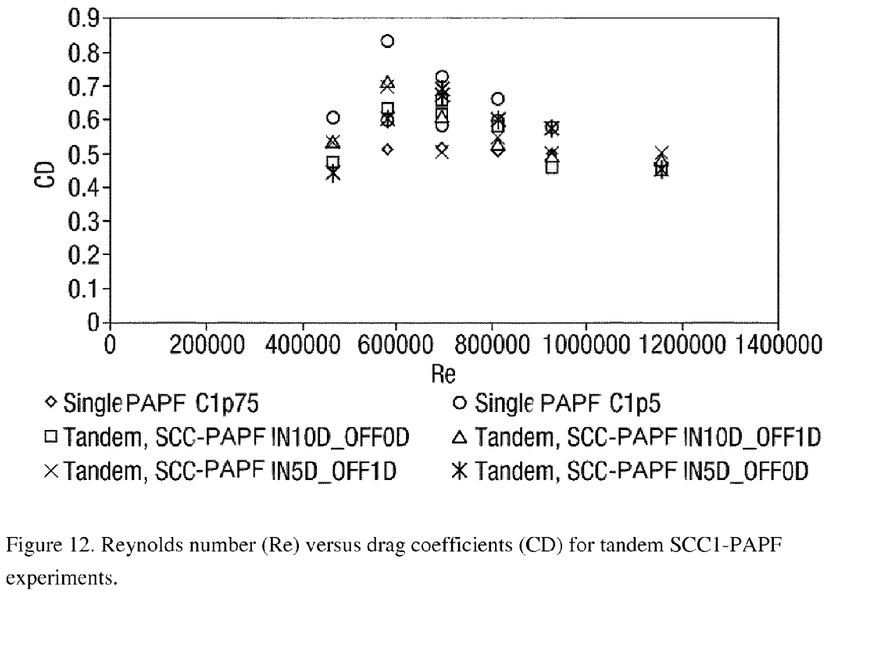
FIG. 12. Reynolds number (Re) versus drag coefficients (CD) for tandem SCC1-PAPF experiments. Drag of downstream pipe for the PAPF fairings.

FIGS. 11 and 12 showing the differences in drag are given. Again, it is seen that the SCC1 faring has a considerably lower drag coefficient than the PAPF fairings over a very wide range of Reynolds number.

Theoretical Studies of Stability

Figure 13A:
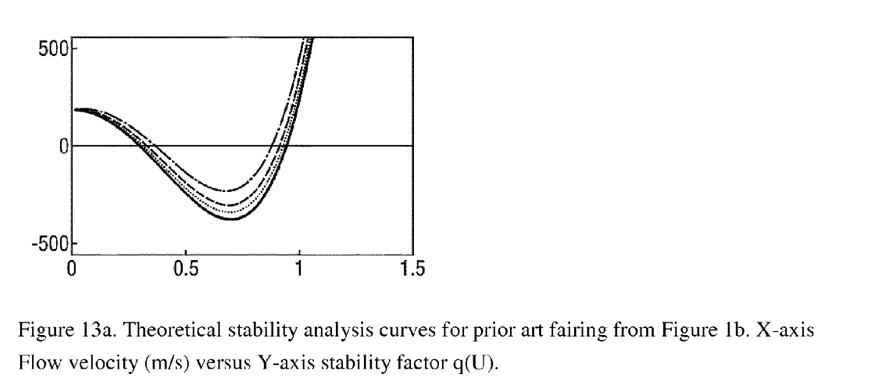
FIG. 13a-c. Theoretical stability analysis curves for prior art fairings from FIG. 1b, 1c and SCC1 fairings.
Figure 13B:
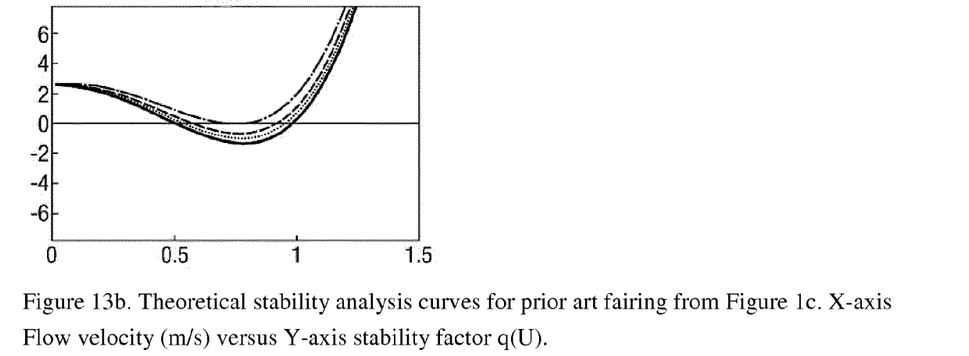
Figure 13C:
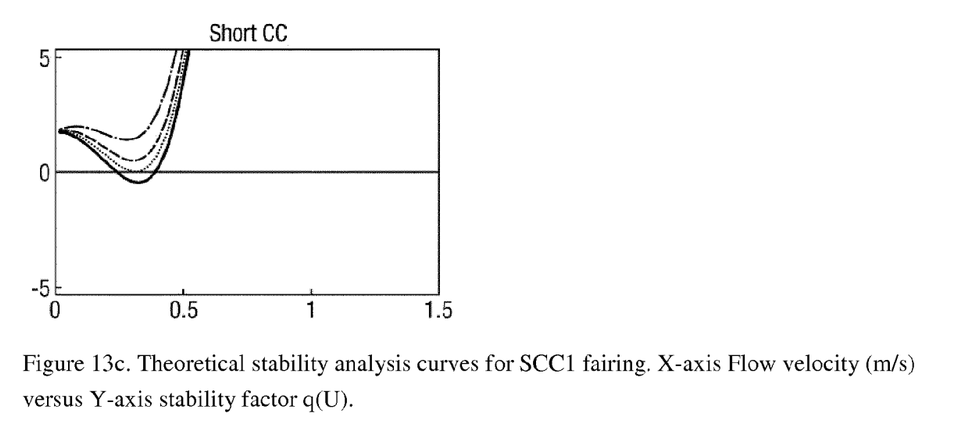

FIGS. 13a-13c show modeling results of the stability analysis for 3 fairing types, as based on the criteria in Blevins (1990) and Newman (1977) and iteration using Routh's method with further derivations and parameterizations as given in Kristiansen (2009) and Faltinsen (2005).

The form of the polynomial in the case of an undamped fairing is given on the y-axis (q(u) [(kg m/s)$^4$]) as:

$$q(U)=q_4U^4+q_2U^2+q_0=0,$$

and is represented by the bottom curve for each of the given fairing types. The x-axis represents the flow velocity (U) in meter/s. For the simulation cases where an empirical Rayleigh damping term ($q_1U$) is added, the polynomial for the y-axis takes the following form:

$$q(U)=q_4U^4+q_2U^2+q_1U+q_0=0,$$

where $$q_1=2\xi\sqrt{q_4q_0},$$

and $\xi$ is a nondimensional number. Higher values for $\xi$ result in higher damping.

The bottom curve for each fairing type represents a simulation without the damping term ($q_1U$). Instability and flutter can appear when the value for q(U) on the curve is negative. The next curve adjacent to the bottom undamped curve includes the damping term $q_1U$ with $\xi=0.04$. The next adjacent curve includes the damping term $q_1U$ with $\xi=0.08$. The next adjacent, top, curve includes the damping term $q_1U$ with $\xi=0.16$.

The terms $q_4$, $q_2$ and $q_0$ are further expressed by the following:

$$q_4 = (M\kappa - \tau m_f r)^2,$$

$$q_2 = 2k\{2\kappa(m_f r)^2 - I(M\kappa + \tau m_f r)\},$$

$$q_0 = k^2 I^2$$

I represents the moment of inertia, $m_f$ represents the mass of the fairing and r represents the distance between the elastic center (EC) and the center of gravity (CG). k, M, $\kappa$, and $\tau$ are parameterization terms as given or derived from the publications cited above.

For systems that have continuous non-negative q(U) values, they are also unconditionally stable. With an emphasis on the results for the SCC1, it can be seen that under real-world conditions with some degree of normal damping, the SCC1 fairing can be seen to be exhibit significant stability, whereas the prior art fairings of FIGS. 1b and 1c exhibit a need for more damping than the SCC1 fairing.

Another advantage according to the present invention, as compared to the prior art, is that the separate SCC fairings operate independently all along the vertical length of the riser. Consider that when operating a fairing in a column of water, the conditions at the top of the riser can be completely different than on the lower section. As such, it is important to have a fairing which is stable in many operating conditions. The prior art fairings the might work well at one section of the riser, whereas they may not work well on other sections. The instability generated at one level can cause instability in other sections.

As seen from numerous laboratory experiments as well as theoretical studies, fairing devices with parallel fins and/or long fins, with higher chord length ratios, are generally less efficient and less stable. The combined features of the present invention show to be more hydrodynamically efficient and smaller, lighter fairings are less bulky, easier to store and easier to install without the need for an ROV. In addition, the present invention is seen to be deployable in a wide range of flow-regimes, corresponding to varying ocean current conditions experienced in various geographic locations worldwide.

The main advantages and improvements achieved with all of the embodiments according to the present invention in comparison with the prior art include the following:
- No operational limits for offshore drilling operations due to drilling riser fatigue from vortex induced vibrations (VIV). This saves time and cost for offshore operators.
- Size/weight: Reduced time spent to fit/mobilize VIV suppression device on an offshore drilling rig. This also saves time and cost for offshore operators.
- Low drag forces on drilling riser: Reduce stress on riser and attached elements
- Performance: Increased ability to suppress vortex induced vibrations (VIV):
  - Drag forces: Reduced as compared to known technology
  - Global stability: Stable performance for all conditions
  - Robustness: Increased robustness of a suppression device Although the foregoing invention has been described in some detail by way of illustration and example for purposes of clarity of understanding, it will be readily apparent to those of ordinary skill in the art in light of the teachings of this invention that certain changes and modifications may be made thereto without departing from the scope of the appended claims.

While the invention has been illustrated and described in detail in the drawings and foregoing description, such illustration and description are to be considered illustrative or exemplary and not restrictive and it is not intended to limit the invention to the disclosed embodiments. The mere fact that certain measures are recited in mutually different dependent claims does not indicate that a combination of these measures cannot be used advantageously.

The invention claimed is:

1. A fairing device for the reduction of vortex-induced vibrations or motions and reduction of drag about a substantially cylindrical element immersed in a fluid medium, comprising;
   a mainly cylindrical element,
   a fairing rotatably mounted about the mainly cylindrical element, the fairing comprising a shell with a mainly cylindrical cross sectional shape with an outer diameter (D) following the outer diameter of said cylindrical element from an upward stagnation point of 0 degrees to at least +/−90 degree locations, which at said +/−90 degree locations continue as two fin-like portions in an aft direction and defining a chord length (C),
   wherein
   the fin-like portions are convexly curved aft of the +/−90 degree locations thus tapering towards each other defining a tail end opening gap less than a fairing standoff height.

2. The fairing device of claim 1, wherein the fin-like portions are convexly curved fore of said +/−90 degree locations thus tapering towards each other and defining said tail end opening gap less than the fairing standoff height.

3. The fairing device of claim 2 wherein the tail end opening gap constitutes more than 80% of the fairing standoff height.

4. The fairing device of claim 2 wherein said tail end opening gap constitutes a range of between 80% and 100% of the fairing standoff height.

5. The fairing device of claim 2 wherein the tail end opening gap is 80% or less than the fairing standoff height.

6. The fairing device of claim 2 wherein the tail end opening gap constitutes more than 80% of the fairing standoff height; and
   wherein the chord length ratio (C/D) is equal to or less than 1.4.

7. The fairing device of claim 2 wherein said tail end opening gap constitutes a range of between 80% and 100% of the fairing standoff height; and
   wherein the chord length ratio (C/D) is equal to or less than 1.4.

8. The fairing device of claim 2 wherein the tail end opening gap is 80% or less than the fairing standoff height; and
   wherein the chord length ratio (C/D) is equal to or less than 1.4.

9. The fairing device of claim 1, wherein the tail end opening gap constitutes more than 80% of the fairing standoff height.

10. The fairing device of claim 1, wherein said tail end opening gap constitutes a range of between 80% and 100% of the fairing standoff height.

11. The fairing device of claim 1, wherein the tail end opening gap is 80% or less than the fairing standoff height.

12. The fairing device of claim 1, wherein the chord length ratio (C/D) is equal to or less than 1.4.

* * * * *